United States Patent
Sugawara

(10) Patent No.: US 10,070,000 B2
(45) Date of Patent: Sep. 4, 2018

(54) IMAGE FORMING APPARATUS, METHOD FOR CONTROLLING IMAGE FORMING APPARATUS, AND A COMPUTER-READABLE STORAGE MEDIUM FOR SELECTING A SHEET FOR PRINTING

(71) Applicant: CANON KABUSHIKI KAISHA, Tokyo (JP)

(72) Inventor: Kazuhiro Sugawara, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 104 days.

(21) Appl. No.: 15/063,128

(22) Filed: Mar. 7, 2016

(65) Prior Publication Data
US 2016/0266853 A1     Sep. 15, 2016

(30) Foreign Application Priority Data
Mar. 9, 2015  (JP) ................................. 2015-046434

(51) Int. Cl.
*H04N 1/32*  (2006.01)
*H04N 1/00*  (2006.01)
(Continued)

(52) U.S. Cl.
CPC ....... *H04N 1/32128* (2013.01); *G06F 3/1204* (2013.01); *G06F 3/1205* (2013.01); *G06F 3/1208* (2013.01); *G06F 3/1257* (2013.01); *G06K 15/1805* (2013.01); *G06K 15/1806* (2013.01); *H04N 1/00212* (2013.01); *H04N 1/32133* (2013.01); *G06F 3/1228* (2013.01);
(Continued)

(58) Field of Classification Search
CPC ........... H04N 1/32133; H04N 1/32128; H04N 1/00212; G06F 3/1205; G03G 15/5095
See application file for complete search history.

(56) References Cited

U.S. PATENT DOCUMENTS 6,836,789 B1 * 12/2004 Toyoda .............. H04N 1/00214
                                                     358/402
2002/0122215 A1 * 9/2002 Watanabe ......... H04M 3/42204
                                                     358/474

(Continued)

FOREIGN PATENT DOCUMENTS

JP     H09-065045 A      3/1997
JP     2006072646 A  *   3/2006

*Primary Examiner* — Nicholas Pachol
(74) *Attorney, Agent, or Firm* — Canon U.S.A., Inc. IP Docketing

(57) ABSTRACT

When receiving an electronic mail from a mail server, an MFP generates received information regarding the received electronic mail and prints an image attached to the electronic mail on a sheet together with the generated received information. A user sets in advance a sheet size used for reception print via a setting screen for a reception print size. When the sheet size is set, the MFP determines whether a length of a side parallel to an order of a character string of the received information to be printed is a predetermined length or longer and performs control to prevent a size determined as not having the predetermined length or longer from being set as a sheet size to be used for printing the image attached to the electronic mail together with the received information.

11 Claims, 15 Drawing Sheets

(51) Int. Cl.
  *G06F 3/12* (2006.01)
  *G06K 15/02* (2006.01)
(52) U.S. Cl.
  CPC .... *G06F 3/1268* (2013.01); *H04N 2201/3226* (2013.01); *H04N 2201/3271* (2013.01)

(56) References Cited

U.S. PATENT DOCUMENTS

| | | | | |
|---|---|---|---|---|
| 2004/0196492 | A1* | 10/2004 | Johnson | H04N 1/00209 358/1.15 |
| 2007/0189783 | A1* | 8/2007 | Hattori | G03G 15/553 399/16 |
| 2008/0162736 | A1* | 7/2008 | Tanaka | G06F 3/1204 710/7 |
| 2008/0232835 | A1* | 9/2008 | Ota | G03G 15/5087 399/45 |
| 2009/0116068 | A1* | 5/2009 | Reichhart | B41F 33/00 358/1.18 |
| 2011/0292439 | A1* | 12/2011 | Nagata | H04N 1/00864 358/1.15 |

* cited by examiner

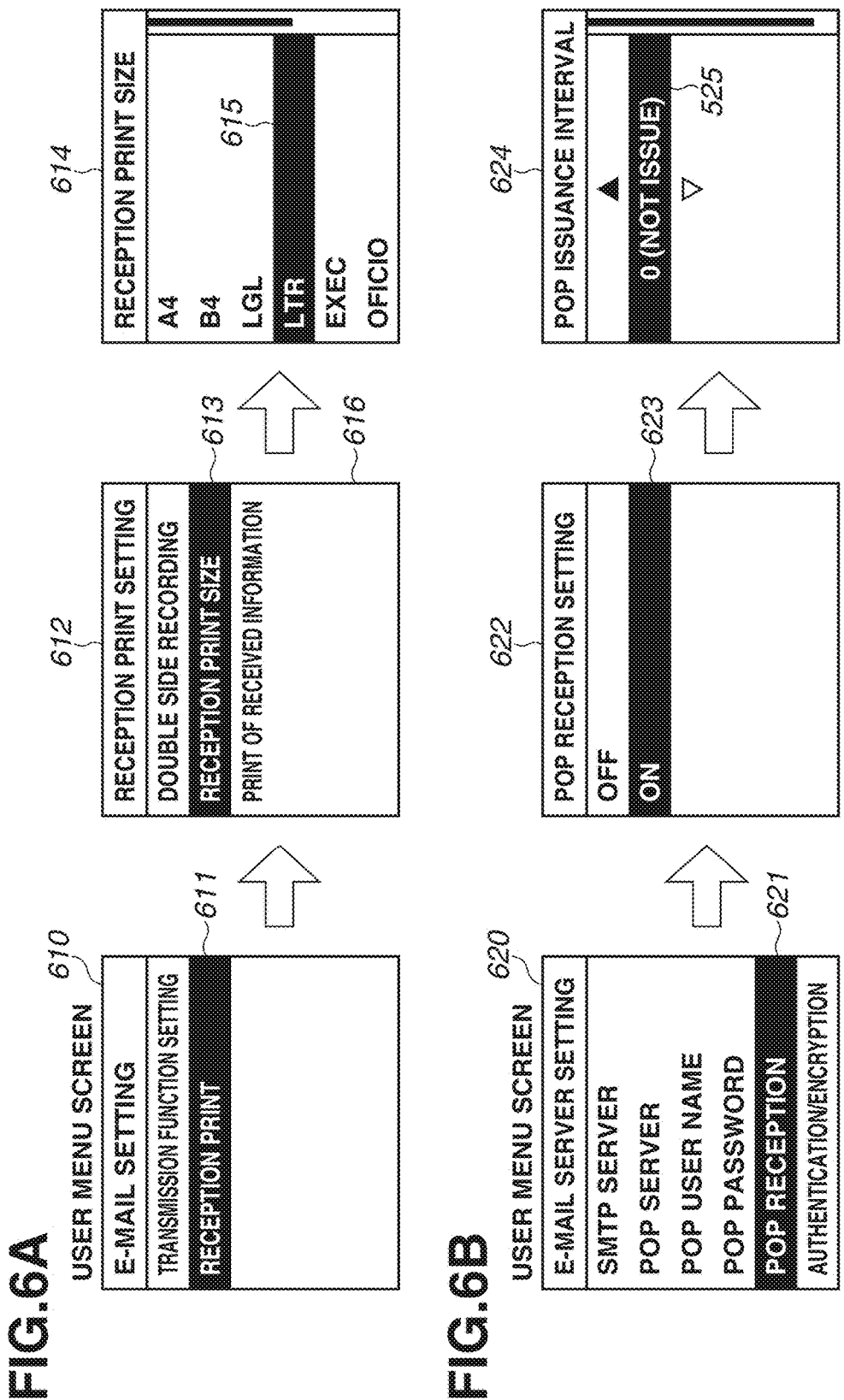

FIG.7

| USER MODE SETTING ITEMS | SETTING CONTENTS |
|---|---|
| E-MAIL RECEPTION SETTING ~701 | |
| SMTP SERVER | SERVER HOST NAME OR IP ADDRESS |
| POP SERVER | SERVER HOST NAME OR IP ADDRESS |
| POP USER NAME | USER NAME TO LOG INTO POP SERVER |
| POP PASSWORD | PASSWORD TO LOG INTO POP SERVER |
| POP RECEPTION | OFF/ON |
| AUTO POP ISSUANCE INTERVAL | 0: NOT ISSUE 1 - 99 |
| AUTHENTICATION/ENCRYPTION SETTING | |
| USE SSL IN POP | OFF/ON |
| CONFIRM CERTIFICATE | DO/DO NOT |
| ADD CN TO VERIFICATION ITEM | DO/DO NOT |
| RECEPTION PRINT SETTING | |
| DOUBLE SIDE RECORDING | OFF/ON |
| RECEPTION PRINT SIZE ~702 | SET SHEET SIZE<br>DEFAULT: AB SERIES → A4, INCH SERIES → LTR |
| PRINT OF RECEIVED INFORMATION | OFF/ON |
| SHEET SETTING ~703 | |
| MANUAL FEEDING | SET SHEET SIZE<br>DEFAULT: AB SERIES → A4, INCH SERIES → LTR |
| CASSETTE | SET SHEET SIZE<br>DEFAULT: AB SERIES → A4, INCH SERIES → LTR |
| CASSETTE 2 | SET SHEET SIZE<br>DEFAULT: AB SERIES → A4, INCH SERIES → LTR |

FIG. 8

| Index | SHEET SIZE | SHEET FEEDING DIRECTION VERTICAL: HORIZONTAL: | LENGTH IN WIDTH DIRECTION (mm) | LENGTH IN FEEDING DIRECTION (mm) |
|---|---|---|---|---|
| 1 | A4 | VERTICAL | 210 | 297 |
| 2 | B5 | VERTICAL | 182 | 257 |
| 3 | A5 | VERTICAL | 148 | 210 |
| 4 | LEGAL | VERTICAL | 215.9 | 355.6 |
| 5 | LETTER | VERTICAL | 215.9 | 279.4 |
| 6 | STATEMENT | VERTICAL | 139.7 | 215.9 |
| 7 | EXECTIVE | VERTICAL | 184 | 266.7 |
| 8 | OFICIO | VERTICAL | 215.9 | 317.5 |
| 9 | B-OFICIO | VERTICAL | 215.9 | 355 |
| 10 | M-OFICIO | VERTICAL | 215.9 | 341 |
| 11 | GOVERNMENT LETTER | VERTICAL | 203.2 | 266.7 |
| 12 | GOVERNMENT LEGAL | VERTICAL | 203.2 | 330.2 |
| 13 | FOOLSCAP | VERTICAL | 215.9 | 330.2 |
| 14 | AFLS | VERTICAL | 206 | 338 |
| 15 | indLGL | VERTICAL | 215 | 345 |
| 16 | 16K | VERTICAL | 195 | 270 |
| 17 | F4A | VERTICAL | 215.9 | 342.9 |
| 18 | K-LGL | VERTICAL | 190 | 268 |
| 19 | POSTCARD | VERTICAL | 100 | 148 |
| 20 | RETURN POSTCARD | VERTICAL | 148 | 200 |
| 21 | FOUR PLANE POSTCARD | VERTICAL | 200 | 296 |
| 22 | ENVELOPE COM10 | VERTICAL | 104.7 | 241.3 |
| 23 | ENVELOPE Monarch | VERTICAL | 98.4 | 190.5 |
| 24 | ENVELOPE N3 | VERTICAL | 120 | 235 |
| 25 | ENVELOPE Y3 | VERTICAL | 120 | 235 |
| 26 | ENVELOPE C5 | VERTICAL | 162 | 229 |
| 27 | ENVELOPE B5 | VERTICAL | 176 | 250 |
| 28 | ENVELOPE DL | VERTICAL | 110 | 220 |
| 29 | USER SETTING SIZE | VERTICAL | 200 | 300 |
| 30 | USER SETTING SIZE 2 | — | — | — |
| 31 | USER SETTING SIZE 3 | — | — | — |

FIG.13

| index | PRINT EXCLUSION UNIQUE ID |
|---|---|
| 1 | "AAg9EBAAAAgsJ0QAPHknJaU2bhWqs9c4" |
| 2 | "AAw9EBAAAAgsJ0QAPHknJaU2bhWqs9c4" |
| 3 | "AAA+EBAAAAgsJ0QAPHknJaU2bhWqs9c4" |
| ⋮ | ⋮ |
| N-1 | "" |
| N | "" |

IMAGE FORMING APPARATUS, METHOD FOR CONTROLLING IMAGE FORMING APPARATUS, AND A COMPUTER-READABLE STORAGE MEDIUM FOR SELECTING A SHEET FOR PRINTING

BACKGROUND OF THE INVENTION

Field of the Invention

The present invention relates to an image forming apparatus which receives and prints image data.

Description of the Related Art

Image forming apparatuses having copy, print, facsimile, Internet facsimile and other functions are known. The above-mentioned image forming apparatuses can hold various sizes of sheets in sheet holding units and use sheets of a plurality of sizes in printing. In addition, image forming apparatuses including a plurality of sheet holding units are also known.

It is known that, when such an image forming apparatus prints image data received from an external apparatus on a sheet, the image forming apparatus automatically selects an appropriate sheet from among sheets of a plurality of sizes held in a plurality of sheet holding units and performs printing (for example, Japanese Patent Application Laid-Open No. 9-65045).

It is also known that, when printing a received image received by an Internet facsimile, the image forming apparatus automatically selects an appropriate sheet according to a number of pixels of image data attached to a received electronic mail and outputs the image.

When a received image received by the Internet facsimile is printed, it is known that information including a transmission source information and date and time information (hereinbelow, referred to as received information) is printed together with image data.

In addition, there is a case that a receiving side user wants to print received images of various sizes on a sheet of a size that the user wants. In such a case, it can be considered that a setting of a sheet size to be used in printing of the received image is received in advance from the user, and printing is performed by reducing or enlarging the received image to fit into the set sheet size.

However, in a case where a sheet size can be set, there is a possibility that, when a small sheet size is set, received information of a print target cannot be included within a predetermined print area (for example, a header area placed on an upper part of a print product), and the received information is partially missing. In such a case, a user who received the Internet facsimile cannot confirm who sent the document or when the document is sent.

On the other hand, when a set sheet size is small, the received information may be printed by entirely reducing its character string. However, the character string of the received information should be printed in a legible size, and it is not desirable to perform printing by reducing the entire character string of the received information.

SUMMARY OF THE INVENTION

An aspect of the present invention is directed to the prevention of missing a part of received information to be printed when a size of a sheet to be used in printing of a received image can be set in consideration of the above-described issues.

According to an aspect of the present invention, an image forming apparatus capable of executing printing on a sheet of a plurality of sizes includes a reception unit configured to receive an electronic mail, a generation unit configured to generate received information regarding the electronic mail received by the reception unit, a setting unit configured to set a size of a sheet to be used in a case where an image attached to the electronic mail received by the reception unit is printed, and a control unit configured to perform control so that a size of which a length of a side parallel to an order of a character string of the received information to be printed is a predetermined length or longer is set by the setting unit from among the plurality of sizes.

Further features of the present invention will become apparent from the following description of exemplary embodiments with reference to the attached drawings.

BRIEF DESCRIPTION OF THE DRAWINGS

FIGS. 6A and 6B illustrate operation screens displayed on the panel.

FIG. 7 illustrates a data model of a setting table of the MFP.

FIG. 8 illustrates a data model of a table managing sheet sizes.

FIG. 13 illustrates a data model of a print exclusion list.

DESCRIPTION OF THE EMBODIMENTS

Exemplary embodiments of the present invention will be described in detail below with reference to the attached drawings. It is noted that the following exemplary embodiments are not meant to limit the scope of the present invention as encompassed by the appended claims. Further, not all combinations of features described in the present exemplary embodiments are essential for solving means of the present invention.

Figure 1:
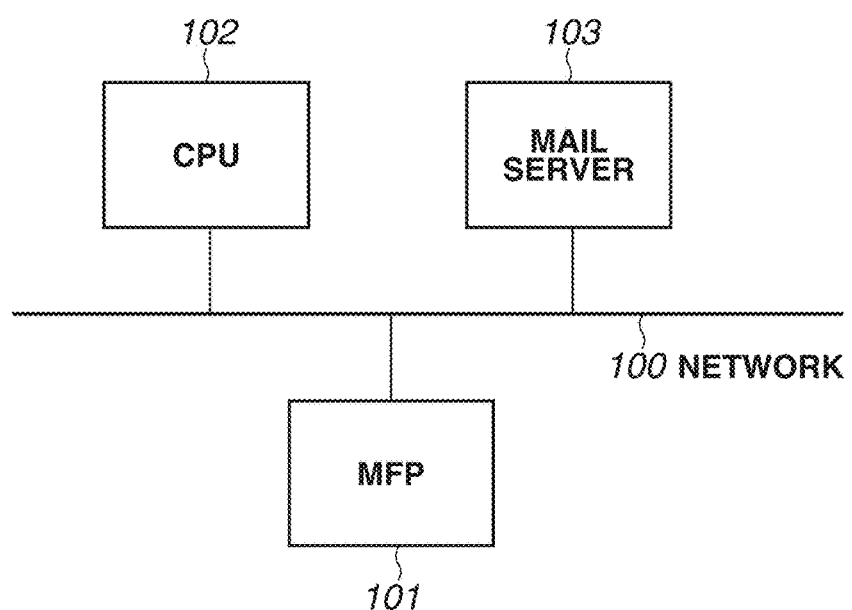
FIG. 1 is an overall view of an image forming system.

A first exemplary embodiment of the present invention is described. FIG. 1 is a block diagram illustrating an image forming system according to the present exemplary embodiment. On a network 100, a multifunction peripheral (MFP) 101, a personal computer (PC) 102, and a mail server 103 are connected to be mutually communicable. According to the present exemplary embodiment, the MFP 101 and the PC 102 are respectively described as an example of an image forming apparatus and an example of an information processing apparatus. The MFP 101 and the PC 102 are connected to the Internet (not illustrated) via the network 100 and can transmit and receive electronic mails between an external apparatus via a plurality of mail servers.

First, the PC 102 is described. A mail client is installed in the PC 102. The mail client installed in the PC 102 transmits a created electronic mail to an external apparatus (an information processing apparatus similar to the PC 102, an image forming apparatus, and the like) via the mail server 103 and receives an electronic mail from the external apparatus.

The mail server 103 has a role in delivery, transmission, and reception of an electronic mail. The mail server 103 receives an electronic mail via the network 100. The received electronic mail is sorted into a mailbox provided for each electronic mail address and stored in a storage (not illustrated). Each electronic mail address is managed by being associated with user information (a user name and a password).

The mail client installed in the MFP 101 and the PC 102 can receive an electronic mail sorted into the mailbox of the mail server 103 using a communication protocol, such as a Post Office Protocol version 3 (POP3) and an Internet Message Access Protocol (IMAP).

Next, the MFP 101 is described. The MFP 101 has a reading function of reading an image on a sheet and a print function of printing an image on a sheet. The MFP 101 can receive an electronic mail transmitted from another image forming apparatus (not illustrated) and the like via the mail server 103. Further, the MFP 101 can print image data attached to the received electronic mail. The MFP 101 according to the present exemplary embodiment can receive an electronic mail transmitted based on International Telecommunication Union Telecommunication Standardization Sector (ITU-T) Recommendation T.37, Procedures for the transfer of facsimile data via store-and-forward on the Internet and print the received electronic mail. In addition, the MFP 101 can transmit an electronic mail (transmit an Internet facsimile) with an attached image data based on T.37. These transmission and reception functions are collectively referred to as an Internet facsimile function (I-FAX function).

According to the present exemplary embodiment, a case is described as an example in which the mail server 103 has both of a transmission server (a simple mail transfer protocol (SMTP) server) function and a reception server (a POP server) function, however, the present exemplary embodiment is not limited to this example. For example, the transmission server and the reception server may be separately configured so as to distribute a load.

Figure 2:
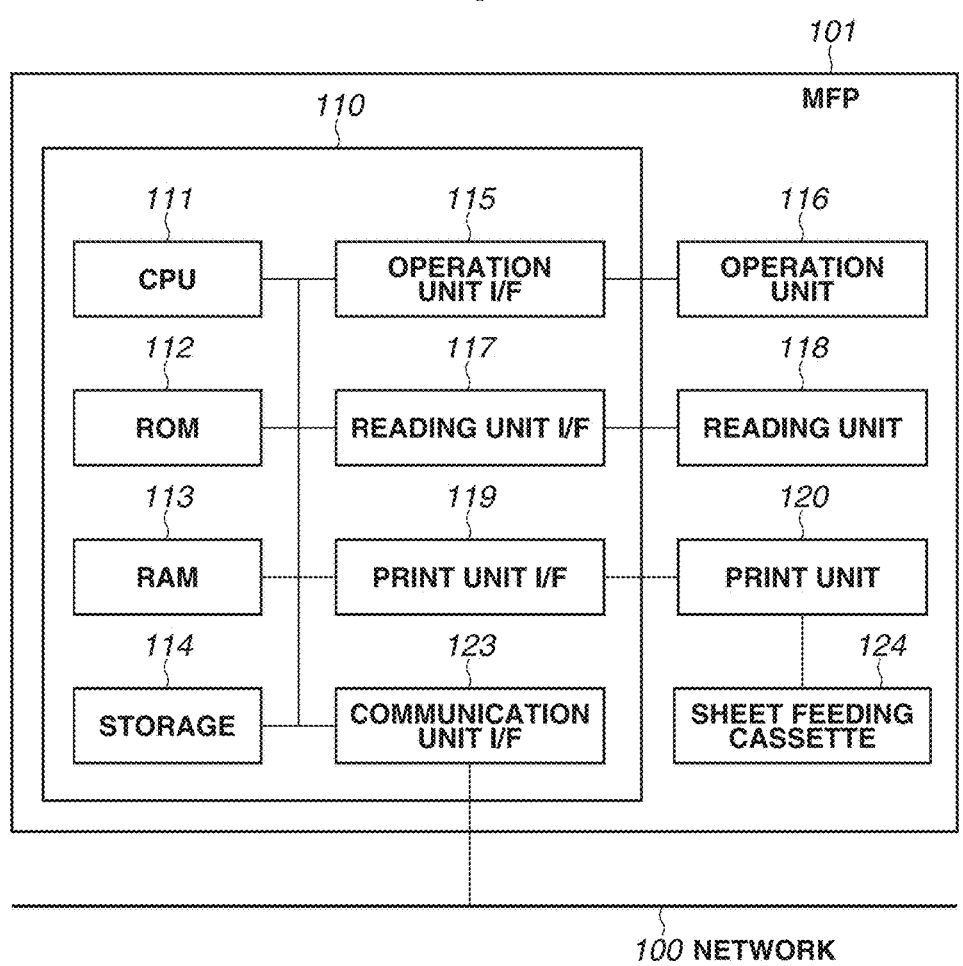
FIG. 2 is a block diagram illustrating a configuration of a multifunction peripheral (MFP).

FIG. 2 is a block diagram illustrating a configuration of the MFP 101 according to the present exemplary embodiment. A control unit 110 including a central processing unit (CPU) 111 controls operations of the entire MFP 101. The CPU 111 reads a control program stored in a read-only memory (ROM) 112 or a storage 114 and performs various types of control, such as reading control and print control. The ROM 112 stores a control program executable by the CPU 111. The ROM 112 also stores a boot sequence, font information, and the like. A random access memory (RAM) 113 is a main storage memory of the CPU 111 and used as a work area and a temporary storage area for developing various control programs stored in the ROM 112 and the storage 114. The storage 114 stores image data, print data, various programs, and various setting information pieces. According to the present exemplary embodiment, a flash memory is assumed as the storage 114, however, an auxiliary storage device, such as a solid state drive (SSD) and a hard disk drive (HDD), may be used.

In the MFP 101 according to the present exemplary embodiment, one CPU 111 executes various types of processing illustrated in flowcharts described below using one memory (the RAM 113), however, another embodiment may be adopted. For example, each processing illustrated in the flowcharts described below can be executed in cooperation with a plurality of CPUs, RAMs, ROMs, and storages. Further, a part of the processing may be executed using a hardware circuit, such as an application specific integrated circuit (ASIC) and a field programmable gate array (FPGA).

An operation unit interface (I/F) 115 connects an operation unit 116 with the control unit 110. The operation unit 116 displays information to a user and inputs an instruction from a user.

A reading unit I/F 117 connects a reading unit 118 with the control unit 110. The reading unit 118 reads an image on a sheet and converts the read image into image data, such as binary data. The image data generated by the reading unit 118 is transmitted to an external apparatus and printed on a sheet.

A print unit I/F 119 connects a print unit 120 with the control unit 110. The CPU 111 transfers image data to be printed (print target image data) to the print unit 120 via the print unit I/F 119. The print unit 120 prints an image on a sheet fed from a sheet feeding cassette 124.

A plurality of sheet feeding cassettes 124 is provided, and information regarding a held sheet size is set in association with each sheet feeding cassette. The MFP 101 may include a manual feeding tray (not illustrated). Hereinbelow, the sheet feeding cassette 124 and the manual feeding tray are referred to as a "holding unit".

The control unit 110 is connected to the network 100 via a communication unit I/F 123. The communication unit I/F 123 transmits image data and information to an external apparatus on the network 100 and receives print data and information from the information processing apparatus on the network 100. As a method of transmission and reception via the network, transmission and reception using the above-described electronic mail and transmission using other protocols (for example, a File Transfer Protocol (FTP) and a Server Message Block (SMB)) can be performed. Further, the MFP 101 can perform facsimile transmission and reception between a facsimile apparatus, not illustrated, via a modem (not illustrated) and a public switched telephone networks (PSTN) (not illustrated).

Figure 3:
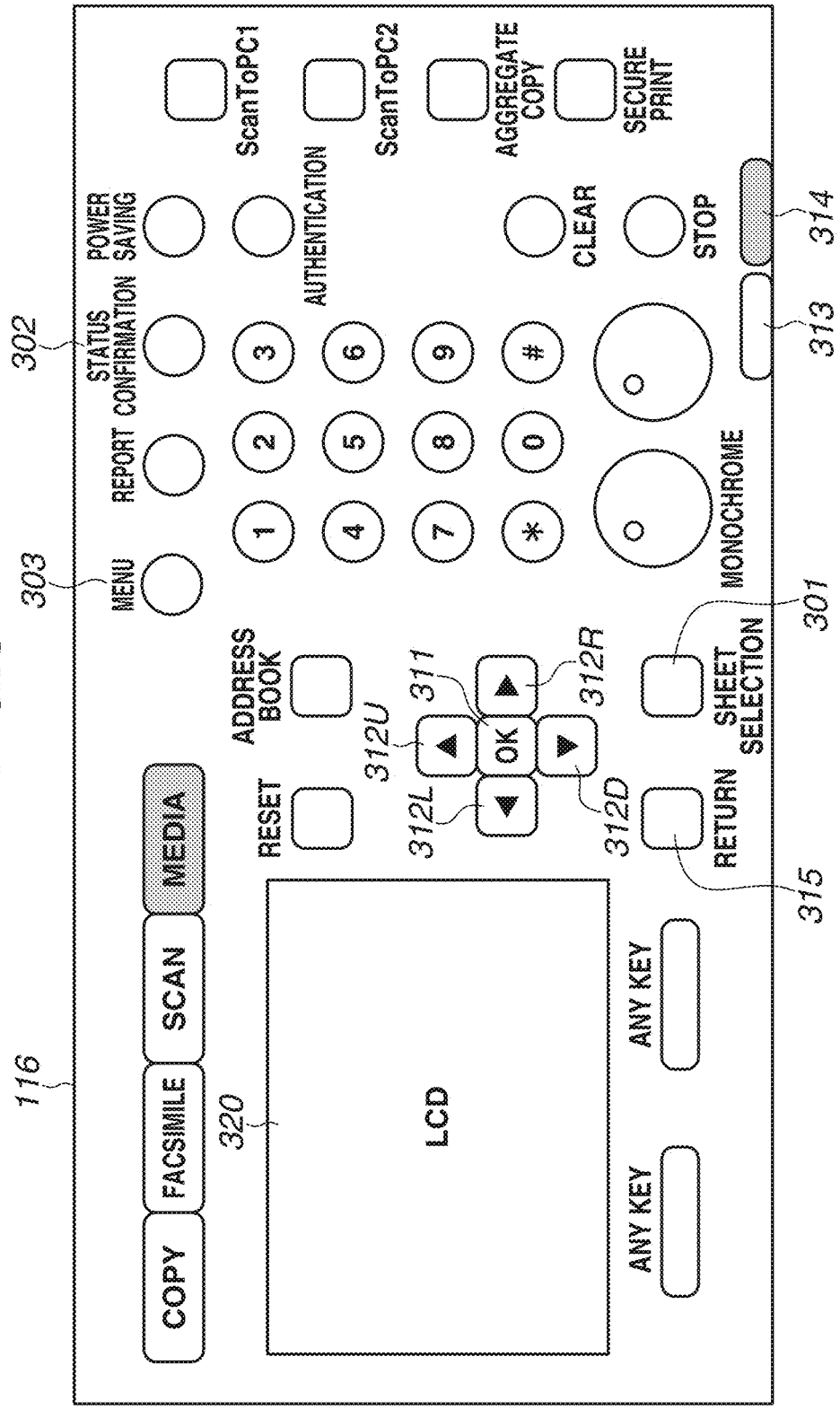
FIG. 3 is an external view of an operation unit 116.

FIG. 3 is an external view of the operation unit 116. The operation unit 116 includes a touch panel 320 for displaying an operation screen described below and various types of hard keys. The panel 320 and the various hard keys function as reception units for receiving an instruction from a user.

The operation unit 116 is provided with scroll keys 312 for selecting an option on a screen displayed on the panel 320 and an OK key 311 for determining the option selected by the scroll keys. A user can specify an item from options on a screen using the scroll keys 312 and the OK key 311. Further, the user can specify an option directly touching the option displayed on the panel 320 with a finger and an object, such as a stylus.

A sheet selection key 301 is used to set a size of a sheet held in the holding unit. A status confirmation key 302 is a key for displaying a screen (a status confirmation screen) for confirming a status of the MFP 101. A user can instruct manual reception of an electronic mail via the status confirmation screen. A menu key 303 is used to display a setting change screen for changing various settings of the MFP 101.

Lamps 313 and 314 are used to notify a user of the status of the MFP. The lamp 313 is lit when an electronic mail or a print job is being received or executed, and the lamp 314 is lit when any error occurs in the MFP 101.

Figure 4:
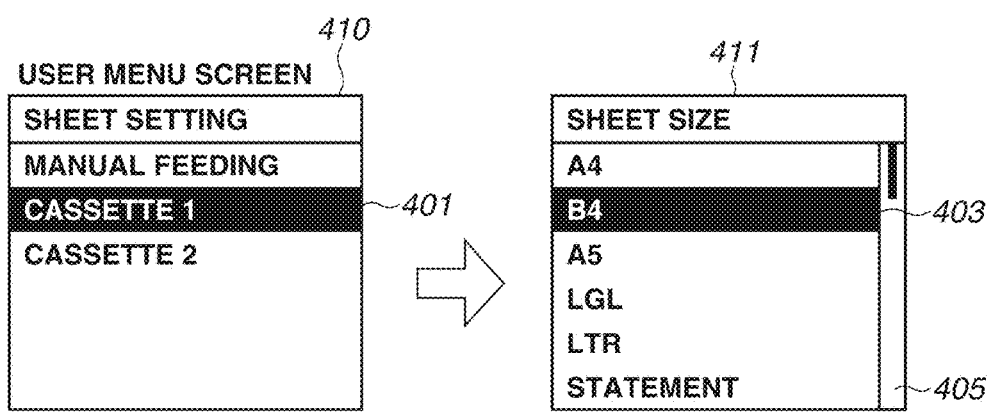
FIG. 4 illustrates operation screens displayed on a panel.

Next, a setting of a sheet size according to the present exemplary embodiment is described. A user can set a size of the sheet held in the holding unit by pressing the sheet selection key 301 on the operation unit 116. FIG. 4 illustrates examples of operation screens displayed by the CPU 111 on the panel 320 of the operation unit 116 and illustrates setting screens (hereinbelow, referred to as a sheet setting screen) regarding sheets held in the holding unit. A user can specify an option (manual feeding, cassette 1, or cassette 2) corresponding to the holding unit by performing a selection operation using a touch operation and hard keys.

An operation screen 410 indicates that a sheet feeding cassette 1 is selected. When the option corresponding to the holding unit is specified, the CPU 111 displays an operation screen 411 on the panel 320. The operation screen 411 shows a state in which B4 (an option 403) is selected as the size of the sheet held in the holding unit. A user can set the size of the sheet held in the selected holding unit via the operation screen 411. A scroll bar 405 notifies the user of the total number of options and a position currently displayed. The user can set the size of the sheet held in the holding unit from among a plurality of sizes by scrolling the options displayed on the panel 320 using the scroll keys 312U and 312D or a touch operation.

FIG. 8 illustrates examples of sheet sizes available for printing. As displayed in the operation screen 411, the CPU 111 displays a list of the sheet sizes indicated in items 801 in a scrollable manner. The CPU 111 stores a setting value regarding the holding unit set by the user as a sheet setting in a setting table in the storage 114.

According to the present exemplary embodiment, all of the sheet sizes indicated in the items 801 are displayed as an example, however, the display is not limited to this example. For example, sizes in the AB series may be displayed, or sizes in the inch series may be displayed. Sizes which can be set as the sizes of the sheets held in the holding unit can be changed based on, for example, information about a destination place (destination country) stored in the MFP 101.

FIG. 7 illustrates an example of a data model of the setting table. An item 703 is a setting item regarding a sheet, and information of the sheet size held in the manual feeding tray, the cassette 1, and the cassette 2 is stored. In FIG. 7, the information of the sheet size is only indicated as the setting regarding the sheet, however, a sheet type (plain paper, thick paper, and the like) may be stored in addition to the sheet size. Further, the information of the size of the sheet held in the holding unit may be automatically set based on a sensor disposed on the holding unit and the like. The setting of the sheet size held in each holding unit is referred to accordingly when the CPU 111 performs print processing in cooperation with the print unit 120 and the like. The CPU 111 feeds a sheet from the holding unit which holds the sheet to be used in printing based on the setting of the sheet size. According to the present exemplary embodiment, a user can define the sheet size available for printing (details are omitted). The sheet size define by the user is stored in, for example, Indices 29 to 31 in FIG. 8. Further, according to the present exemplary embodiment, the sheet defined by the user is handled as a nonstandard size sheet.

According to the present exemplary embodiment, the holding unit holds a sheet in such a manner that a short side of the sheet is perpendicular to a sheet feeding direction. Thus, the sheet held in the holding unit is conveyed to the print unit 120 with its short side at the leading edge (Short Edge Feed).

Next, a reception print function of printing an image attached to a received electronic mail (hereinbelow, referred to as a received image) is described. The reception print function according to the present exemplary embodiment is to print information about a transmission source mail address and reception date and time (hereinbelow, referred to as received information) together with a received image.

In this regard, a receiving side user wants to print received images of various sizes on a sheet of a size that the user wants in some cases. In view of the situation, the MFP 101 according to the present exemplary embodiment can receive a setting of a sheet size used for printing the received image from the user and perform printing by reducing or enlarging the received image according to the set sheet size.

Figure 5A:
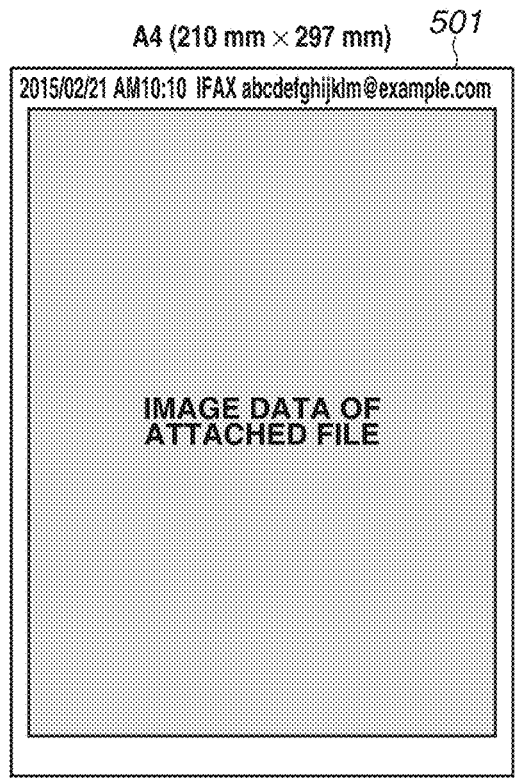
FIGS. 5A to 5C illustrate print examples of a received image.
Figure 5B:
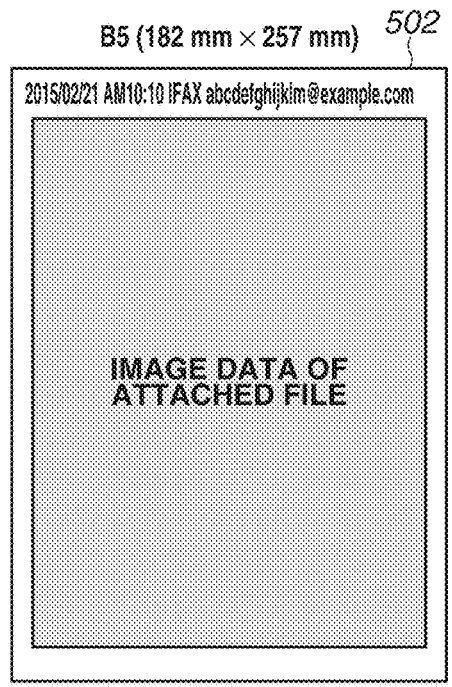
Figure 5C:
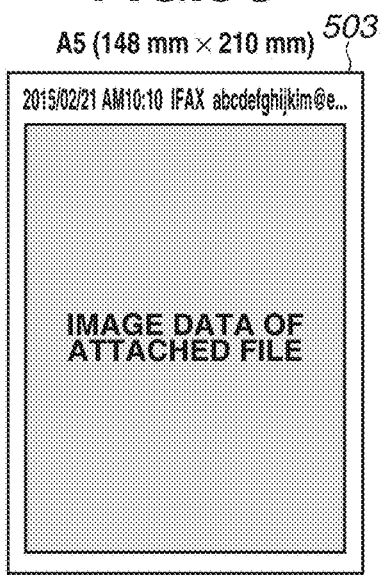

FIGS. 5A to 5C are print examples of the received image by the reception print function. FIG. 5A illustrates a case when the received image is printed on an A4 size sheet. FIG. 5B illustrates a case when the received image is printed on a B5 size sheet. Further, FIG. 5C illustrates a case when the received image is printed on an A5 size sheet.

As illustrated in FIGS. 5A, 5B, and 5C, the received image is printed by being reduced or enlarged to fit into the sheet size. Thus, printing is performed without missing a part of area in the image data or without an extra margin.

On the other hand, the received information is printed in a size easy to read for a user (for example, a size of 24 dots or more). In this regard, it is assumed that the received information is added to an upper part (header) or a lower part (footer) of a print product in one line. A case is described as an example in which a transmission source electronic mail address is "abcdefghijklm@example.com" including 25 characters. According to the present exemplary embodiment, a case is described as an example in which items of the received information as a print target include reception date and time of an electronic mail, a fixed character string "IFAX", and the transmission source electronic mail address. The received information as the print target is not limited to the above-described items, and a print order and items can be changed accordingly. According to the present exemplary embodiment, the CPU 111 obtains the time when an electronic mail is received from a real time clock in the MFP 101 and prints the reception date and time, however, the time is not limited to the above-described one. For example, data and time when a mail is delivered to the mailbox in the mail server 103 may be printed as the reception date and time.

As the A4 size and the B5 size illustrated in FIGS. 5A and 5B, if a short side length (a length in a width direction) of a sheet is a predetermined length or longer, the exemplified address can be printed as a whole when the received information is printed in one line. In addition, if an electronic mail address is longer than the exemplified address, at least 30 characters from the beginning of the electronic mail address can be printed as the received information on a sheet of the B5 size or larger.

On the other hand, when it is intended to print the received information in one line on the A5 size sheet illustrated in FIG. 5C, only a part of the exemplified address (15 characters from the beginning) is printed, and a remaining part is missing. In FIGS. 5A to 5C, a case is illustrated as an example in which the received information is printed so that an order of the character string is parallel to the short side of the sheet, however, printing is not limited to this example. When an image attached to an electronic mail is rotated and printed, the received information may be printed so that the order of the character string is parallel to a long side of the sheet.

As described above, when a sheet of which a short side length is short (for example, a sheet smaller than the B5 size) is set as a sheet to be used in the reception print function, it is more likely to miss a part of the mail address to be printed. In addition, the number of characters which can be printed is reduced, and a missing part of the mail address becomes larger when the mail address is partially missing. In other words, an information amount for identifying a transmission source is reduced, and it is more likely that a receiving side user cannot confirm the transmission source. Further, when the character string of the reception date and time is printed after the character string of the electronic mail address, the reception date and time may be missing.

In view of the above-described issue, according to the present exemplary embodiment, it is assumed that printing is performed on a sheet on which at least a predetermined number of characters (for example, 30 characters) can be printed from the beginning of an electronic mail address so as to increase a possibility of enabling a user to confirm the transmission source. More specifically, control to cause a user to select a sheet size of a predetermined size or larger is described which is performed when a setting of the sheet size used in the reception print function is received.

Next, a setting of the sheet size used in the reception print function is described. A user can change a setting regarding a function provided in the MFP 101 and a setting regarding operation control of the MFP 101 by pressing the menu key 303.

FIGS. 6A and 6B illustrate examples of setting screens displayed by the CPU 111 on the panel 320 of the operation unit 116. FIG. 6A illustrates the setting screens regarding an electronic mail. When the menu key 303 is pressed, the CPU 111 displays a menu screen (not illustrated). When it is determined that an option for performing the setting regarding the electronic mail is specified via the menu screen (not illustrated), the CPU 111 displays a setting screen 610 for performing the setting regarding the electronic mail.

A user can perform a setting regarding a transmission function of the electronic mail and a setting regarding the reception print function via the setting screen 610. An option 611 is used when the setting regarding the reception print function is performed. When the option 611 is specified via the operation unit 116, the CPU 111 displays a setting screen 612 regarding the reception print function. The user can set whether to print the received information or not as an item of the setting regarding the reception print function. The user can specify an option 616 and set "ON" or "OFF" of printing of the received information. When "ON" is set, the setting is to print the received information, and when "OFF" is set, the setting is not to print the received information. When the setting whether to print the received information is changed, the CPU 111 stores setting information based on the relevant setting in the setting table shown in FIG. 7. The stored setting information may be referred to accordingly by control described below. The CPU 111 performs control not to receive the setting of "ON" when a predetermined size (B5 or smaller) is set by the setting of a reception print size described below.

The user can set the reception print size as an item of the setting regarding the reception print function. An option 613 is used when the setting of the reception print size is performed. When the option 613 is specified via the operation unit 116, the CPU 111 displays a selection screen 614 regarding the reception print size. The user can set the sheet size used in the reception print function via the screen 614.

Figure 9:
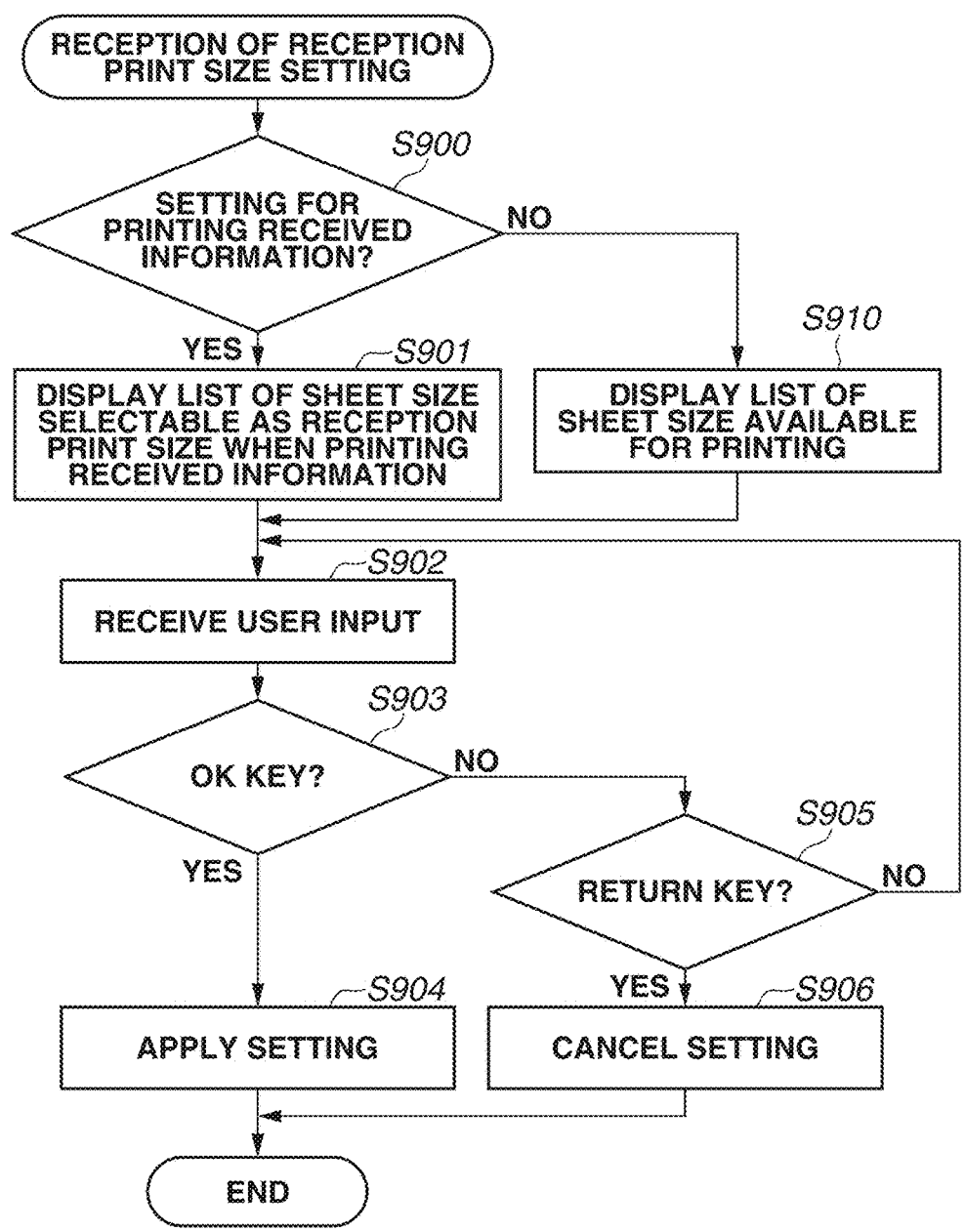
FIG. 9 is a flowchart illustrating setting control of a reception print size.

The setting of the sheet size used in the reception print is described with reference to a flowchart in FIG. 9. Each operation (step) in the flowchart illustrated in FIG. 9 is realized by the CPU 111 reading the control program stored in the ROM 112 or the storage 114 to the RAM 113 and executing the control program. When it is determined that the option 613 is specified via the operation unit 116 (in other words, when it is determined that a setting instruction of the sheet size used in the reception print function is received), the CPU 111 executes the control corresponding to the flowchart illustrated in FIG. 9.

In step S900, the CPU 111 determines whether a setting is for printing the received information based on a setting value regarding printing of the received information. When the setting value regarding printing of the received information stored in the storage 114 and the like is ON (YES in step S900), the processing proceeds to step S901. Whereas when the setting value is OFF (NO in step S900), the processing proceeds to step S910. In step S910, the CPU 111 obtains a list of sheet sizes indicated in the items 801 and displays the list of sheet sizes available for printing on the panel 320. The list of sheet sizes displayed in step S910 is similar to that displayed on a sheet size screen in FIG. 4.

On the other hand, in step S901, in the case of the setting for printing the received information, the CPU 111 displays the sheet size which can be set as the sheet size used in the reception print function on the panel 320. The selection screen 614 (FIG. 6A) is an example of a selection screen of the sheet size used in the reception print function displayed on the panel 320. More specifically, the CPU 111 refers to the table regarding the sheet size. FIG. 8 illustrates an example of a table managing the sheet sizes stored in the ROM 112 or the storage 114 of the MFP 101. In FIG. 8, sheet sizes that the MFP 101 can use in printing are stored in association with each item. In an item 803, a length in a width direction (a length of a short side) is stored for each sheet size. In an item 804, a length in a feeding direction (a length of a long side) in printing is stored for each sheet size.

Returning to the description of FIG. 9, the CPU 111 determines whether the length in the width direction stored in the item 803 is the predetermined length or longer for each sheet size in FIG. 8. Further, the CPU 111 generates a list of sheet sizes of which the length in the width direction is the predetermined length or longer based on a determination result. Next, the CPU 111 generates the selection screen 614 (FIG. 6A) from the generated list of sheet sizes and displays the screen on the panel 320. Therefore, the sheet size of which the length in the width direction is less than the predetermined length is not displayed as a selection candidate of the reception print size.

According to the present exemplary embodiment, an example of the predetermined length is regarded as "182 mm", however, the length is not limited to this example. The predetermined length may be changed according to the number of characters and a character size desired to be printed as the received information.

According to the present exemplary embodiment, a case is described as an example in which the CPU 111 determines whether the length in the width direction in the item 803 is the predetermined length or longer and generates the list of sheet sizes, however, the processing is not limited to this example. For example, a flag indicating whether the length in the width direction is the predetermined length or longer may be stored in the table shown in FIG. 8 as an item of each sheet size. In this case, in step S901, the list of sheet sizes may be generated based on presence or absence of the flag. When the list of sheet sizes is generated, the CPU 111 may switch the list of sheet sizes to be displayed based on the destination place (destination country). For example, the CPU 111 may display a list of sheet sizes in the AB series and of which the length in the width direction is the predetermined length or longer or a list of sheet sizes in the inch series and of which the length in the width direction is the predetermined length or longer. Further, when the list of sheet sizes is generated, the CPU 111 may display a size list of standard size sheets and of which the length in the width direction is the predetermined length or longer. In this case, a size classified into the standard size and having the predetermined length or longer is displayed as the selection candidate of the reception print size. Therefore, a nonstandard size (for example, a user setting sheet defined by a user) is not displayed as the selection candidate of the reception print size.

In step S902, the CPU 111 receives an input via the screen 614. In step S903, the CPU 111 determines whether the OK key 311 is pressed. When the OK key 311 is pressed (YES in step S903), the processing proceeds to step S904. On the other hand, when the OK key 311 is not pressed (NO in step S903), the processing proceeds to step S905. Further, when it is determined that the option displayed on the panel 320 is specified by a touch operation, the CPU 111 performs control to advance the processing to step S904.

In step S905, the CPU 111 determines whether a return key 315 is pressed. When the return key 315 is pressed (YES in step S905), the processing proceeds to S906. On the other hand, when the return key 315 is not pressed (NO in step S905), the processing returns to step S902, and the CPU 111 further receives an input.

In step S904, the CPU 111 applies the setting performed via the screen 614. More specifically, the CPU 111 updates the setting value used in the reception print function based on the specified sheet size. An item 701 shown in the setting table in FIG. 7 indicates setting contents regarding reception of an electronic mail and includes a setting of the reception print size in an item 702 as an item of the setting. The CPU 111 stores information corresponding to the specified sheet size in a setting value 721 in the item 702. The information stored in the setting value 721 may be index information shown in FIG. 8 or information of the sheet size shown in the item 801.

Returning to the description of FIG. 9, in step S906, the CPU 111 deletes the setting performed via the screen 614 and displays the reception print setting screen 612.

As described above, the setting control based on the flowchart in FIG. 9 is performed, and thus the sheet size of which the length in the width direction is the predetermined length or longer can be set as the sheet size to be used when the received image is printed together with the received information.

Next, a setting of automatic reception used in the reception print function is described. A user can change the setting regarding the function provided in the MFP 101 and the setting regarding the operation control of the MFP 101 by pressing the menu key 303.

When the menu key 303 is pressed, the CPU 111 displays the menu screen (not illustrated). When a setting regarding an electronic mail server is specified via the menu screen (not illustrated), the CPU 111 displays a setting screen 620 regarding the electronic mail server on the panel 320. FIG. 6B illustrates the setting screens regarding the electronic mail server.

A user can performs a setting regarding a SMTP server and a setting regarding a POP server via the screen 620. More specifically, server addresses of the SMTP server and the POP server and items of a user identification (ID) and a password necessary for authentication by the server can be set.

As an item of the setting regarding the POP server, an inquiry to the POP server can be set. An option 621 is used when a setting regarding the inquiry to the POP server (hereinbelow, referred to as the POP reception setting) is performed. When the option 621 is specified via the operation unit 116, the CPU 111 displays a POP reception setting screen 622. A user can set either of "ON" or "OFF" as the POP reception setting via the screen 622. When the POP reception setting is set to "OFF", the setting is not to make the inquiry to the POP server. When the POP reception setting is set to "OFF", it is controlled not to receive an inquiry to the POP server by a manual operation (details are described below). On the other hand, when the POP reception setting is set to "ON", the setting is to make the inquiry to the POP server. When the POP reception is set to "ON", an interval for automatically receiving an electronic mail (hereinbelow, referred to as a POP issuance interval) can be set.

When an option 623 is specified via the screen 622, the CPU 111 displays a screen 624 for setting the POP issuance interval. A user can set the interval for automatically receiving an electronic mail in a range from "0" to "99" via the screen 624. When "0" is set, the setting is not to perform the automatic reception. Further, when a value "1" or larger is set, the setting is to make the inquiry to the POP server at the set interval (in minutes). For example, when "10" is set, the setting is to make the inquiry to the POP server for every 10 minutes. The CPU 111 issues an instruction to start the inquiry to the POP server for every POP issuance interval in cooperation with a timer not illustrated.

The CPU 111 stores the setting information performed via the screens 622 and 624 in setting values 711 and 712 shown in FIG. 7. The stored setting information may be referred to accordingly by control described below.

Figure 10:
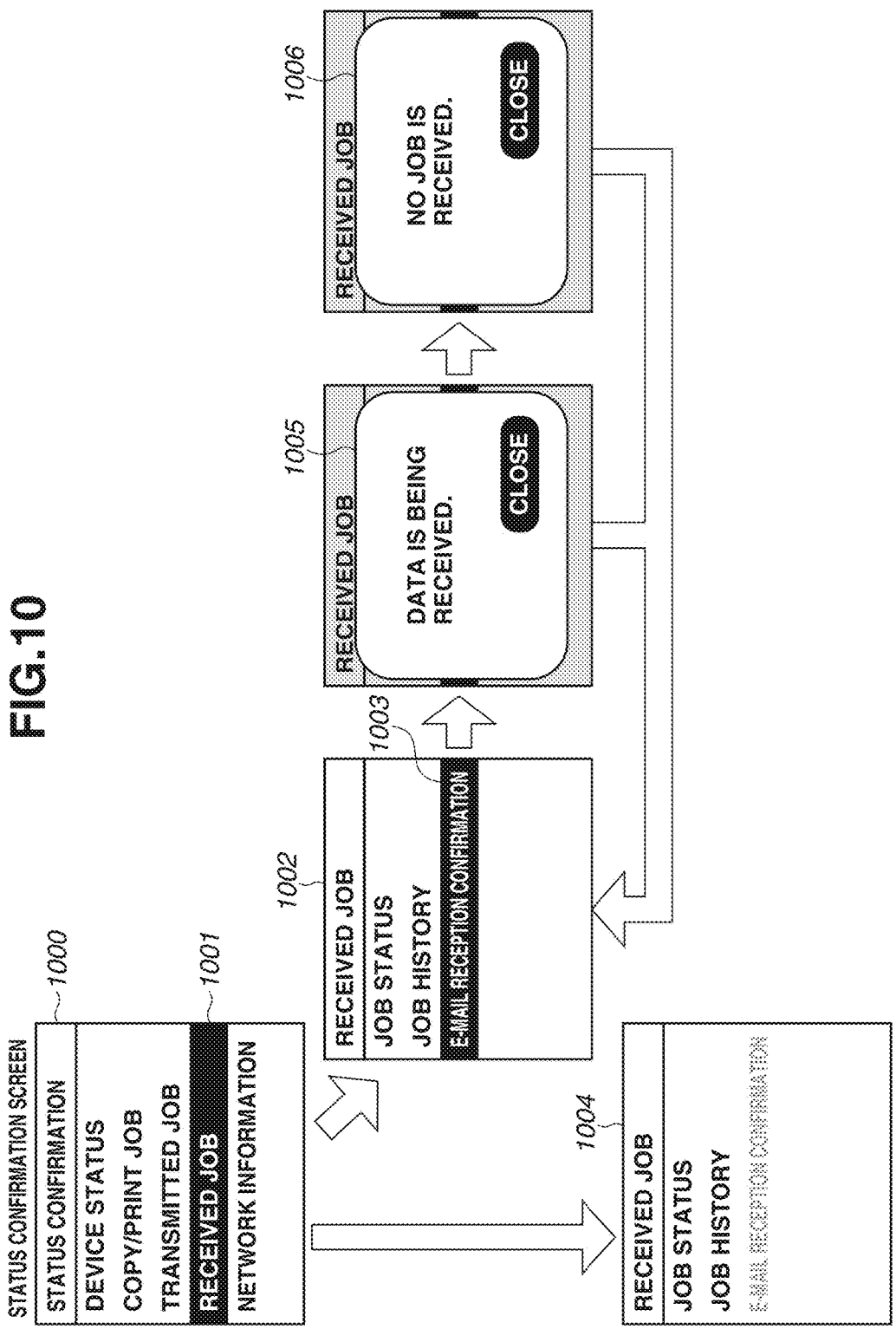
FIG. 10 illustrates operation screens displayed on the panel.

Next, a method for manually inquiring of the POP server is described. First, a user can confirm a job status by pressing the status confirmation key 302. FIG. 10 illustrates examples of screens displayed by the CPU 111 on the panel 320 of the operation unit 116.

When the status confirmation key 302 is pressed, the CPU 111 displays a status confirmation screen 1000 on the panel 320. The user can confirm a job execution status and history information of the MFP 101 via the screen 1000. An option 1001 is used to confirm a status regarding a received job. When the option 1001 is specified, the CPU 111 displays a received job screen. At that time, the CPU 111 refers to the setting value 712 regarding the POP reception in the setting table shown in FIG. 7 and displays a received job screen 1002 when the POP reception is set ON. On the other hand, the CPU 111 refers to the setting value 712 and displays a received job screen 1004 when the POP reception is set OFF. When the CPU 111 displays the screen 1004, an option 1003 for issuing an instruction to make the inquiry to the POP server by the manual operation is set in a gray out state, namely an unselectable state. Therefore, when the POP reception is set OFF, the inquiry to the POP server by the manual operation cannot be performed.

On the other hand, when the option 1003 is specified via the screen 1002, the CPU 111 start making the inquiry to the POP server. Further, the CPU 111 displays a pop-up screen 1005 for notifying a user of making the inquiry to the POP server. If an electronic mail to be received is found by the inquiry, the CPU 111 receives the electronic mail and performs processing for printing image data attached to the electronic mail. When the print processing is completed, the CPU 111 closes the pop-up screen 1005 and terminates the inquiry by the manual operation. In addition, when a "CLOSE" key is specified via the pop-up screen 1005, the CPU 111 closes the pop-up screen. In this regard, after the pop-up screen 1005 is closed, reception and printing of an electronic mail is continuously executed.

On the other hand, if no electronic mail to be received is found as a result of the inquiry to the POP server, the CPU 111 closes a pop-up screen 1006. In addition, when the "CLOSE" key is specified via the pop-up screen 1006, the CPU 111 closes the pop-up screen.

As described above, the inquiry to the POP server can be made manually based on an operation via the received job screen 1002.

Figure 11:
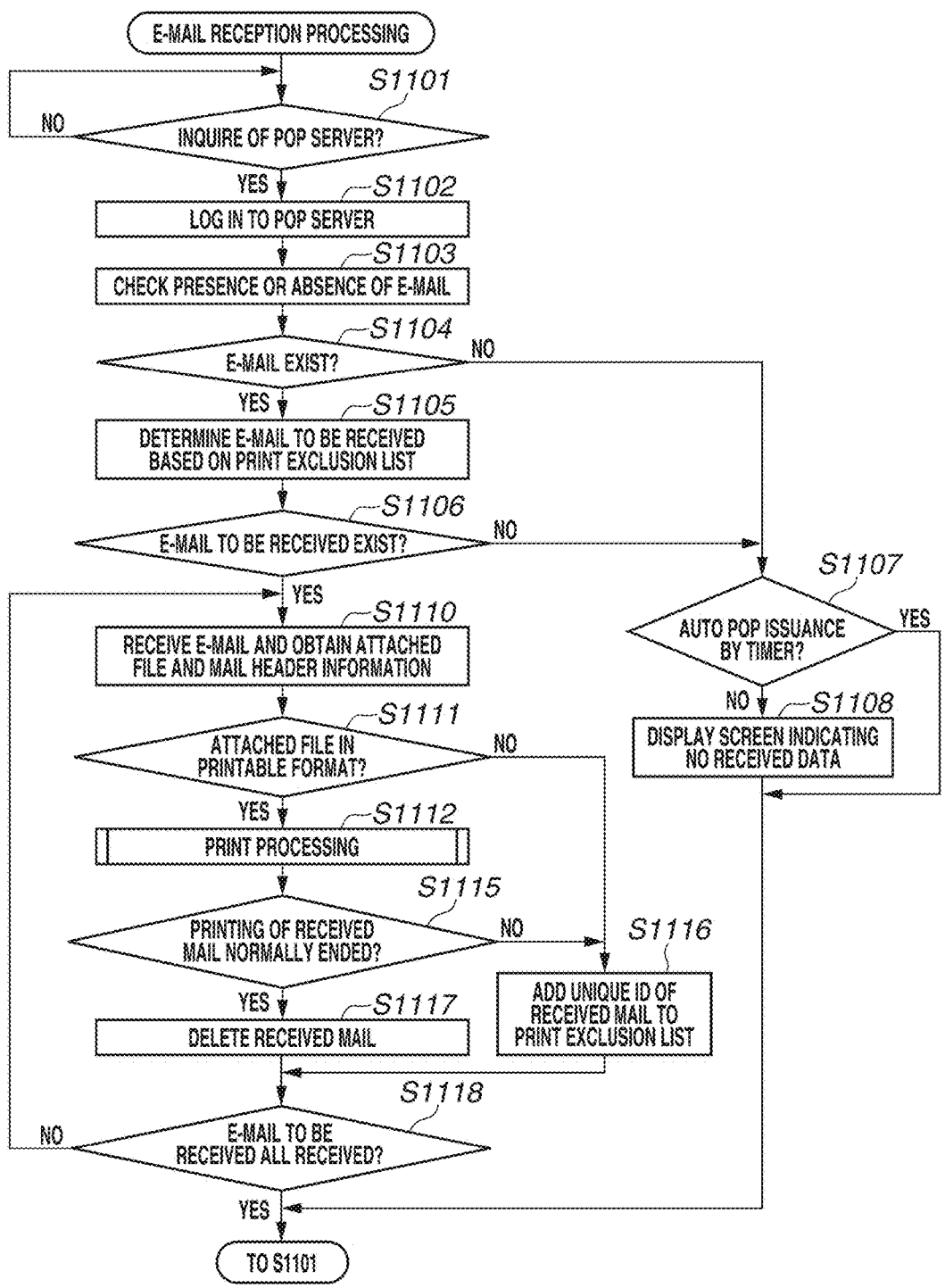
FIG. 11 is a flowchart illustrating print control of a received image.
Figure 12:
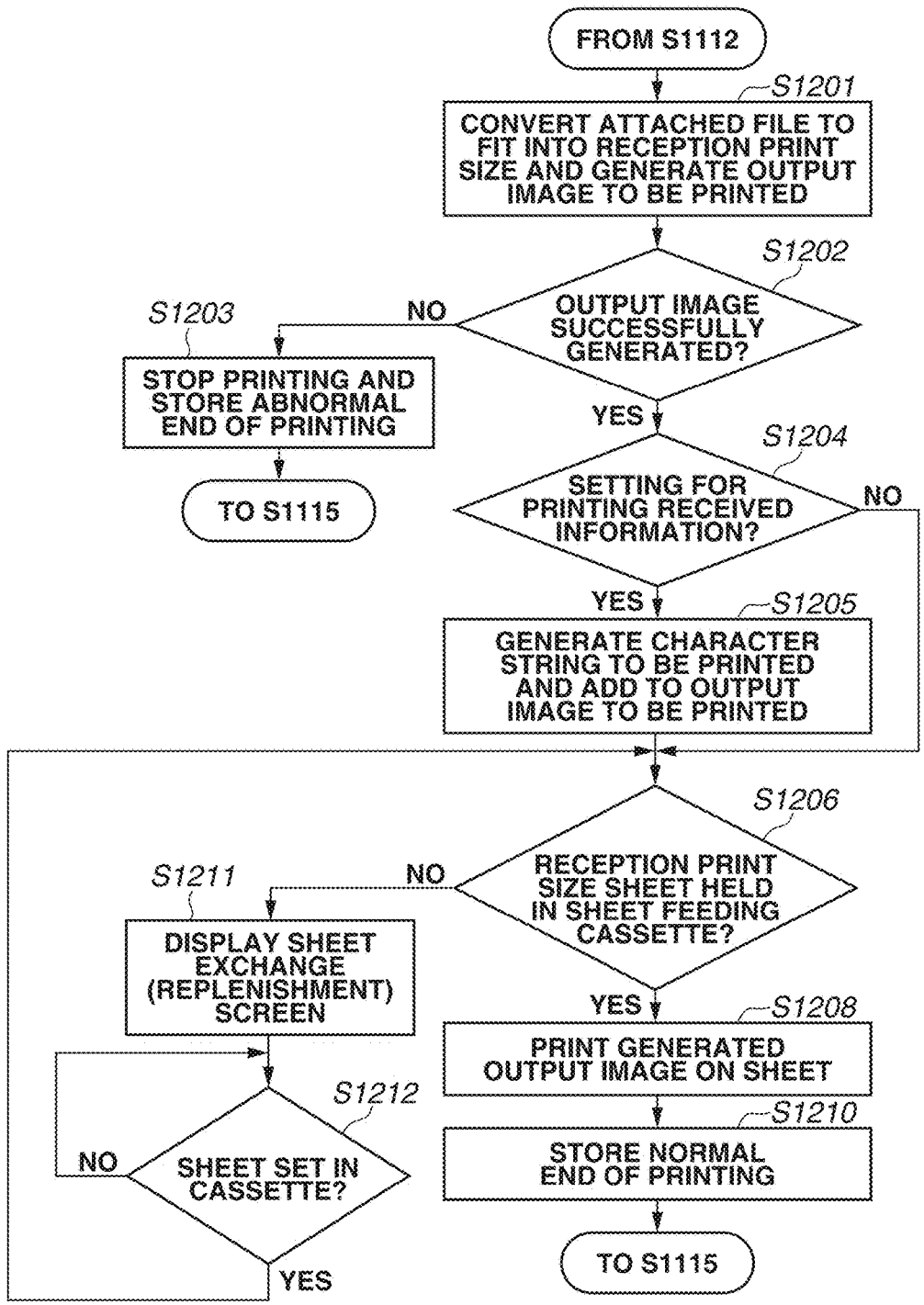
FIG. 12 is a flowchart illustrating print control of a received image.

Next, control regarding the reception print function according to the present exemplary embodiment is described. FIGS. 11 and 12 are flowchart illustrating operations of the reception print function. Each operation (step) in the flowcharts illustrated in FIGS. 11 and 12 is realized by the CPU 111 reading the control program stored in the ROM 112 or the storage 114 to the RAM 113 and executing the control program.

The CPU 111 executes the control corresponding to the flowchart in FIG. 11 when the MFP 101 is started up. In step S1101, the CPU 111 determines whether to make an inquiry to the POP server. When the CPU 111 determines to make the inquiry to the POP server by timer interrupt (YES in step S1101), the processing proceeds to step S1102. In addition, when the CPU 111 determines that an operation for making the inquiry to the POP server is manually performed via the panel 320, the processing proceeds to step S1102. On the other hand, when the inquiry by the timer interrupt or the operation for making the inquiry is not performed (NO in step S1101), the processing returns to step S1101, and the CPU 111 waits for occurrence of an event for making an inquiry to the POP server.

In step S1102, the CPU 111 transmits the user ID and the password stored in the setting table shown in FIG. 7 to the POP server to request login (authentication). When the login is successful, the processing proceeds to step S1103. When the login fails, the CPU 111 displays a connection error screen on the panel 320 and returns the processing to step S1101 (not illustrated).

In step S1103, the CPU 111 transmits a STAT command to the POP server and waits for a response from the POP server. The STAT command is a command for confirming the number of mails and data sizes stored in a mailbox of a login user. When a response from the POP server is received, the processing proceeds to step S1104.

In step S1104, if the number of mails stored in the mailbox is "0" based on the response received from the POP server, the CPU 111 determines that there is no electronic mail (NO in step S1104) and advances the processing to step S1107. On the other hand, if the number of mails stored in the mailbox is one or more based on the response, the CPU 111 determines that there is the electronic mail (YES in step S1104) and advances the processing to step S1105.

In step S1105, the CPU 111 determines an electronic mail to be received from among the mails stored in the mailbox based on a print exclusion list. FIG. 13 illustrates a data model of the print exclusion list. In the print exclusion list shown in FIG. 13, an ID (unique identifier, hereinbelow, referred to as a unique ID) for uniquely identifying an electronic mail which is determined as unprintable by the CPU 111 is stored. The unique ID is identification information for identifying an electronic mail on the POP server. The unique ID is generated by combining a process ID, time information, and the like so as not to cause duplication in the same mailbox.

Returning to the description of FIG. 13, when printing of image data attached to an electronic mail is abnormally ended (for example, when there is no attached image and when generation of an output image based on the attached image fails), the CPU 111 adds the unique ID of the relevant electronic mail to the list. The print exclusion list is comprised of, for example, a ring buffer and the like, and when the number of the unique IDs exceeds the last of the buffer (index is N), the unique ID is overwritten from the beginning of the buffer (index is 1). Thus, the print exclusion list is managed by a first in first out (FIFO) method.

Returning to the description of FIG. 11, the CPU 111 transmits a unique ID listing (UIDL) command to the POP server and obtains the unique ID of each electronic mail stored in the mailbox. The CPU 111 searches the print exclusion list using the obtained unique ID as a key. As a result of the search, when the obtained unique ID does not match with the unique ID excluded from printing, the CPU 111 sets the electronic mail corresponding to the relevant message number as the electronic mail to be received. If a plurality of mails is stored in the mailbox, the CPU 111 performs matching with the print exclusion list on unique ID corresponding to each mail and determines the electronic mail to be received.

In other words, the processing in step S1105 performs control not to receive an electronic mail matching the print exclusion list again.

In step S1106, the CPU 111 determines whether there is an electronic mail determined to be received in step S1105. When there is one or more electronic mails to be received (YES in step S1106), the processing proceeds to step S1110. Whereas when there is no (zero) electronic mail to be received (NO in step S1106), the processing proceeds to step S1107.

In step S1107, the CPU 111 determines whether a trigger for the inquiry to the POP server in step S1101 is an automatic inquiry by the timer interrupt. In the case of the automatic inquiry by the timer interrupt (YES in step S1107), the CPU 111 returns the processing to step S1101 and waits for a further reception instruction. On the other hand, if it is determined as not the automatic inquiry by the timer interrupt (as the inquiry to the POP server by the manual operation) (NO in step S1107), the processing proceeds to step S1108.

In step S1108, the CPU 111 displays the pop-up screen 1006 indicating that there is no received data on the panel 320 and returns the processing to step S1101. When the "CLOSE" key is pressed via the pop-up screen 1006, the CPU 111 closes the pop-up screen.

On the other hand, in step S1110, the CPU 111 transmits to the POP server a retrieve (RETR) command specifying a message number corresponding to the electronic mail to be received and receives the electronic mail. Further, the CPU 111 obtains header information and an attached file of the received electronic mail.

In step S1111, the CPU 111 determines whether the attached file attached to the received electronic mail is in a printable format. When there is no attached file or the attached file is in an unprocessable format, the CPU 111 determines as unprintable (NO in step S1111) and advances the processing to step S1116. On the other hand, if the attached file is in a printable format (YES in step S1111), the CPU 111 advances the processing to step S1112. In step S1112, the CPU 111 performs control to execute print processing of the attached file. Details are described with reference to the flowchart in FIG. 12.

In step S1201, the CPU 111 decodes the attached file, enlarges or reduces the decoded image data to fit into the reception print size, and generates an output image used in printing. In step S1202, the CPU 111 determines whether the output image is successfully generated in step S1201. When generation of the output image is successful (YES in step S1202), the processing proceeds to step S1204. Whereas when generation of the output image fails because of occurrence of an error or the like during the processing (NO in step S1202), the processing proceeds to step S1203.

In step S1203, the CPU 111 stops printing of the image data attached to the electronic mail received in step S1110. Further, the CPU 111 stores a flag indicating an abnormal end of printing in the temporary storage area of the RAM 113 and advances the processing to step S1115.

In step S1204, the CPU 111 determines whether a setting for printing the received information is made. When printing of the received information is set to ON (YES in step S1204), the processing proceeds to step S1205. Whereas when printing of the received information is set to OFF (NO in step S1204), the processing proceeds to step S1206 by skipping step S1205.

In step S1205, the CPU 111 generates a character string to be printed based on the header information and the reception date and time of the electronic mail obtained in step S1110. Next, the CPU 111 generates image data by rasterizing the generated character string and adds the rasterized image data to the output image generated in step S1201. A position to which the rasterized image data is added may be a header portion or a footer portion of the output image. Further, the rasterized image data may be printed to overlap with the output image or printed on the outside of the output image.

Next, in step S1206, the CPU 111 obtains the reception print size with reference to the setting table (FIG. 7). Next, the CPU 111 determines whether a sheet of a same size as the obtained reception print size is held in the holding unit. When the sheet of the same size as the obtained reception print size is held in the holding unit (YES in step S1206), the CPU 111 determines to feed a sheet used in printing from the relevant holding unit and advances the processing to step S1208. On the other hand, when the sheet of the same size as the obtained reception print size is not held in the holding unit (NO in step S1206), the CPU 111 advances the processing to step S1211.

In step S1208, the CPU 111 controls the print unit 120 and the holding unit to feed a sheet used in printing to the print unit and print the output image to which the received information is added on the sheet. When printing on the sheet is completed, the processing proceeds to step S1210. In step S1210, the CPU 111 stores a flag indicating a normal end of printing in the temporary storage area of the RAM 113 and advances the processing to step S1115.

On the other hand, in step S1211, the CPU 111 displays a sheet exchange screen or a sheet replenishment screen on the panel 320. If there is the holding unit to which the sheet size same as the reception print size is set, the CPU 111 presents a user with information for replenishing the sheet to prompt the user to replenish the holding unit with sheets. On the other hand, if there is no holding unit to which the sheet size same as the reception print size is set, the CPU 111 presents a user with information for changing the sheet to prompt the user to change sheets.

In step S1212, the CPU 111 determines whether the sheet is set in the holding unit. When the CPU 111 detects that the sheet is changed or replenished (YES in step S1212), the CPU 111 return the processing to step S1206. When the CPU 111 does not detect that the sheet is changed or replenished (NO in step S1212), the CPU 111 waits until the sheet is changed or replenished.

Returning to the description of FIG. 11, in step S1115, the CPU 111 determines whether printing is normally ended. If the flag indicating the normal end of printing is set, the CPU 111 determines that printing is normally ended (YES in step S1115) and advances the processing to step S1117. On the other hand, if the flag indicating the normal end of printing is not set (the flag indicating the abnormal end of printing is set) (NO in step S1115), the CPU 111 advances the processing to step S1116.

In step S1116, the CPU 111 adds the unique ID of the received electronic mail to the print exclusion list and advances the processing to step S1118. On the other hand, in step S1117, the CPU 111 transmits a deletion (DELE) command to the POP server, deletes the electronic mail of which printing is completed from the mailbox, and advances the processing to step S1118. In step S1118, when the electronic mail to be received still remains (NO in step S1118), the CPU 111 returns the processing to step S1110 and performs control to execute reception and print processing of the remaining electronic mail. On the other hand, when the electronic mails to be received are all received from the POP server (YES in step S1118), the CPU 111 returns the processing to step S1101 and waits for occurrence of an event for making an inquiry to the POP server.

According to the present exemplary embodiment, the control to cause the MFP 101 to perform printing on a sheet of the same size as the reception print size is described as an example, however the control is not limited to this example. For example, when it is determined as NO in step S1206, and if it is determined that a sheet of which a short side length is longer than the reception print size is held in the holding unit, printing may be performed on the sheet. If there is a plurality of sheets of which a short side length is longer than the reception print size, a sheet is fed from the holding unit which holds a sheet of which a size is the closest to the reception print size.

According to the present exemplary embodiment, a case is described as an example in which an unprintable mail is left in the mailbox, however, an unprintable mail may be deleted. In this case, the processing in step S1117 may be performed in place of the processing in step S1115 and step S1116.

Further, according to the present exemplary embodiment, a case is described as an example in which whether to print the received information or not can be set, however, the present exemplary embodiment is not limited to this example. The present exemplary embodiment can be applied to an MFP which always prints the received information. In this case, the processing in step S900 and step S910 in FIG. 9 and the processing in step S1204 in FIG. 12 are not necessary, so that the CPU 111 skips the relevant processing. Further in this case, a setting value regarding printing of the received information and control regarding the setting (the option 616) become unnecessary from items of the reception print setting. Furthermore, the CPU 111 may enable a setting of whether to print the received information and perform control to prevent a size smaller than a predetermined size from being set regardless of the setting.

As described above, according to the present exemplary embodiment, when a user sets a sheet size used in the reception print function, it is controlled that a size smaller than the predetermined size is prevented from being set. Accordingly, when printing by the reception print function is performed, the received information can be printed in the predetermined number of characters or more. Therefore, the present exemplary embodiment can suppress a case in which a user cannot confirm the received information from an output product.

Further, when the received information is set not to be printed, it can be controlled not to place a restriction on a setting of a sheet size used in the reception print function. Therefore, when the received information is not printed, a range of the sheet sizes used in the reception print function can be expanded.

According to a second exemplary embodiment, a method for printing received information by dividing into a plurality of lines and suppressing a case in which information regarding a transmission source cannot be confirmed is described in addition to the first exemplary embodiment. A hardware configuration of the apparatus as a premise of the second exemplary embodiment is similar to that of the first exemplary embodiment. A detailed description of the configuration similar to that of the first exemplary embodiment is omitted.

Figure 14A:
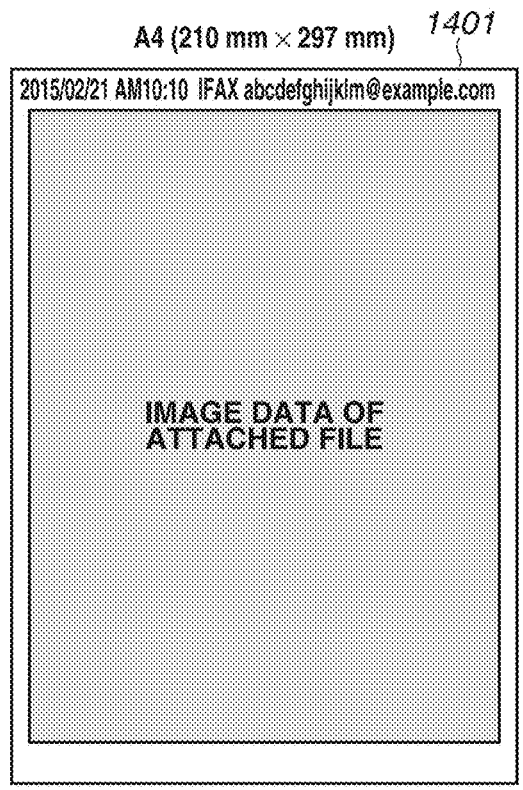
FIG. 14A to 14C illustrate print examples of a received image.
Figure 14B:
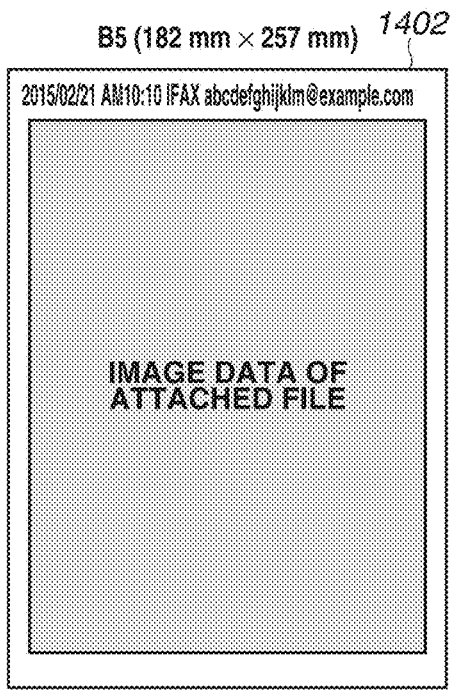
Figure 14C:
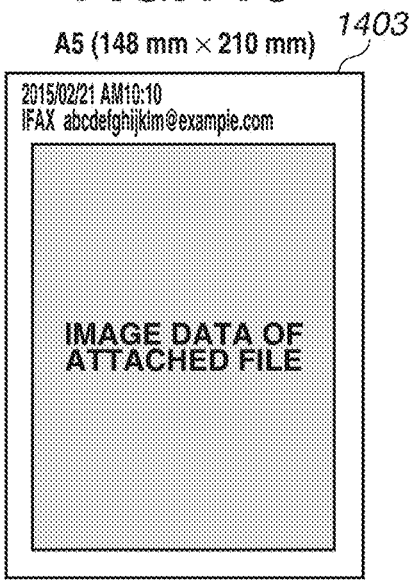

FIGS. 14A to 14C are print examples of the received image by the reception print function according to the second exemplary embodiment. FIG. 14A illustrates a case when the received image is printed on an A4 size sheet. FIG. 14B illustrates a case when the received image is printed on a B5 size sheet. FIG. 14C illustrates a case when the received image is printed on an A5 size sheet. By the reception print function according to the present exemplary embodiment, when received information does not fit into one line, the received information is added to an upper part (header) or a lower part (footer) of a print product in a plurality of lines. A case is described as an example in which a transmission source electronic mail address is "abcdefghijklm@example.com". According to the present exemplary embodiment, a case is described in which the received information includes reception date and time of an electronic mail, a fixed character string "IFAX", and the transmission source electronic mail address The received information is not limited to the above-described items, and a print order and items can be changed accordingly.

As the A4 size and the B5 size illustrated in FIGS. 14A and 14B, when the received information can be printed in one line, the received information is printed in one line. Further, as the A5 sheet illustrated in FIG. 14C, when the received information cannot be printed in one line, the received information is printed by being divided into a plurality of lines.

As described above, the received information is printed by being divided into a plurality of lines, and thus a sheet of a size smaller than that of the first exemplary embodiment can be used in the reception print function. For example, according to the present exemplary embodiment, an example when the predetermined length is "148 mm" is described. In this case, a user can set a sheet size of which a length in the width direction is 148 mm or more as the reception print size in advance. The predetermined length may be changed accordingly.

Figure 15:
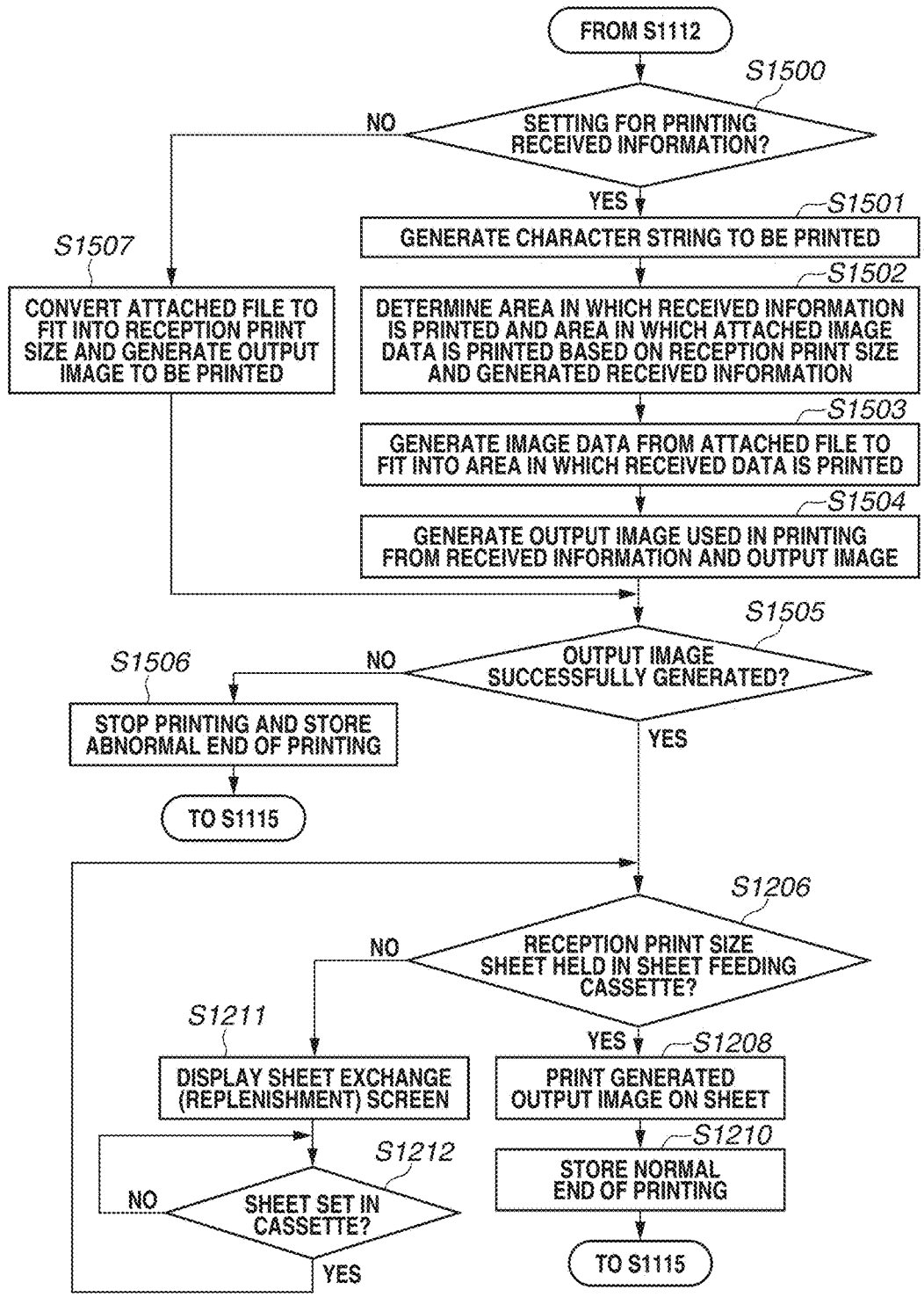
FIG. 15 is a flowchart illustrating print control of a received image.

Next, control to print the received information by dividing into a plurality of lines is described. The CPU 111 executes the control corresponding to the flowchart in FIG. 11 when the MFP 101 is started up. In the processing from step S1101 to step S1111, the CPU 111 receives an electronic mail to be received from the POP server, and when a printable attached file is attached thereto, the CPU 111 proceeds to print processing in step S1112. The processing from step S1101 to step S1111 is similar to that in the first exemplary embodiment, and thus the description thereof is omitted. In step S1112, the CPU 111 performs control to execute print processing of the attached file. Details are described with reference to the flowchart in FIG. 15. According to the second exemplary embodiment, the processing in the flowchart illustrated in FIG. 15 is executed in place of the flowchart illustrated in FIG. 12 described in the first exemplary embodiment. Each operation (step) in the flowchart illustrated in FIG. 15 is realized by the CPU 111 reading the control program stored in the ROM 112 or the storage 114 to the RAM 113 and executing the control program.

In step S1500, the CPU 111 determines whether a setting for printing the received information is made. When printing of the received information is set to ON (YES in step S1500), the processing proceeds to step S1501. Whereas when printing of the received information is set to OFF (NO in step S1500), the processing proceeds to step S1507.

In step S1507, the CPU 111 decodes the attached file, enlarges or reduces the decoded image data to fit into the reception print size, and generates an output image used in printing. When generation processing of the output image is completed, the processing proceeds to step S1505.

In step S1501, the CPU 111 generates a character string to be printed based on the header information and the reception date and time of the electronic mail received in step S1110.

In step S1502, the CPU 111 determines an area for printing the received information based on the reception print size and the text data of the received information generated in step S1110. More specifically, the CPU 111 determines how many characters of the received information can be printed in one line based on a short side length of the reception print size. When the character string to be printed fits into one line, the CPU 111 secures a print area for one line as an area for printing the received information. On the other hand, when the character string does not fit into one line, the CPU 111 secures a print area for a plurality of lines. For example, a character string indicating a reception date is printed in the first line, and then the fixed character string "IFAX" and the transmission source mail address are printed on the second and subsequent lines. In this regard, all character strings of the transmission source mail address may be printed or, for example, a predetermined number of characters from the beginning (for example, 30 characters) may be printed. In this case, the CPU 111 secures an area enough for printing two or three lines of the character string according to the number of characters to be printed. Next, the CPU 111 determines an area for printing image data attached to the electronic mail based on the determined area for printing the received information.

In step S1503, the CPU 111 decodes the attached file and generates image data by enlarging or reducing the decoded image data to fit into a size of the area for printing the image data determined in step S1502. In step S1504, the CPU 111 generates an output image used in printing based on the character string of the received information and the image data resized to fit into the area for printing the image data. When generation of the output image is completed, the processing proceeds to step S1505.

In step S1505, the CPU 111 determines whether the output image is successfully generated. When generation of the output image is successful (YES in step S1505), the CPU 111 advances the processing to step S1206 and subsequent steps and performs control to print the generated output image. The processing in step S1206 and subsequent steps is similar to that in the first exemplary embodiment, and thus the description thereof is omitted. On the other hand, when generation of the output image fails because of occurrence of an error or the like during the processing (NO in step S1505), the processing proceeds to step S1506. In step S1506, the CPU 111 stops print processing, stores a flag indicating an abnormal end of printing in the temporary storage area of the RAM 113, and advances the processing to step S1115.

Returning to the description of FIG. 11, when the print processing described in FIG. 15 is completed, the processing proceeds to step S1115. In step S1115 and the subsequent steps, the CPU 111 performs post processing on the received mail similar to that in the first exemplary embodiment.

According to the present exemplary embodiment, a case is described as an example in which whether to print the received information or not can be set, however, the present exemplary embodiment is not limited to this example. The present exemplary embodiment can be applied to an MFP which always prints the received information. In this case, the processing in step S1500 and step S1507 in FIG. 15 is not necessary, so that the CPU 111 skips the relevant processing. Furthermore, the CPU 111 may enable a setting of whether to print the received information and perform control to prevent a size smaller than a predetermined size from being set regardless of the setting.

As described above, the image forming apparatus according to the second exemplary embodiment prints the received information by dividing into a plurality of lines in the reception print function and thus can print the predetermined number of characters of the received information or more. Therefore, the second exemplary embodiment can suppress a case in which a user cannot confirm the received information from an output product while increasing types of the sheet sizes which can be set as the reception print size more than the first exemplary embodiment.

Further, when the received information is set not to be printed, it can be controlled not to place a restriction on a setting of a sheet size used in the reception print function. Therefore, when the received information is not printed, a range of the sheet sizes used in the reception print function can be expanded.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the aspect of the present invention, when a size of a sheet to be used in printing of a received image can be set, a part of received information can be prevented from missing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-046434, filed Mar. 9, 2015, which is hereby incorporated by reference herein in its entirety.

What is claimed is:

1. An image forming apparatus capable of executing printing on a sheet included in sheets of a plurality of sizes, the image forming apparatus comprising:
    a communication interface configured to receive an electronic mail;
    a generation unit configured to generate a header regarding the electronic mail received by the communication interface; and
    a user interface configured to accept a setting of printing the header or a setting of not printing the header and display a selection candidate for a sheet based on the accepted setting as a selection candidate for a sheet to be used for printing an image attached to the electronic mail received by the communication interface,
    wherein the user interface displays the sheets of the plurality of sizes as selection candidates for the sheet in accordance with accepting the setting of not printing the header, displays a sheet having a short side length equal to or larger than a predetermined length as a selection candidate for the sheet in accordance with accepting the setting of printing the header and does not display a sheet having a short side length smaller than the predetermined length as a selection candidate for the sheet in accordance with accepting the setting of printing the header, and
    wherein at least the generation unit is implemented by a processor and a memory.

2. The image forming apparatus according to claim 1, wherein the header includes a character string indicating an electronic mail address of a transmission source.

3. The image forming apparatus according to claim 2, wherein the header includes a character string indicating reception date and time.

4. The image forming apparatus according to claim 1, wherein the user interface receives an input of a sheet size as an irregular size, and
    wherein the user interface does not display a sheet of the irregular size as a selection candidate for the sheet even if the sheet received as the irregular size has a short side length equal to or larger than the predetermined length.

5. The image forming apparatus according to claim 1, further comprising:
    a holding unit configured to hold a sheet to be used for printing,
    wherein a user's selection of the selection candidate for the sheet displayed by the user interface is received, and
    wherein a screen for prompting replenishment of the sheet of which the user's selection is received is displayed in accordance with the sheet of which the user's selection is received not being held by the holding unit.

6. The image forming apparatus according to claim 1, further comprising:

a holding unit configured to hold a sheet to be used for printing, wherein a user's selection of a sheet displayed by the user interface is received, and wherein a sheet having a short side length larger than a short side length of the sheet of which the user's selection is received is used for printing in accordance with the short side length of the sheet of which the user's selection is received being equal to or larger than the predetermined length and the sheet of which the user's selection is received not being held by the holding unit.

7. The image forming apparatus according to claim 1, further comprising:

a storage device configured to store a short side length of each of sheets of the plurality of sizes, wherein the user interface displays a sheet having a short side length equal to or larger than the predetermined length stored in the storage device.

8. The image forming apparatus according to claim 1, wherein the predetermined length is 182 mm.

9. The image forming apparatus according to claim 1, wherein the selection candidates for the sheet are displayed in a list by the user interface.

10. A method for controlling an image forming apparatus capable of executing printing on a sheet included in sheets of a plurality of sizes, the method comprising:

receiving an electronic mail;

generating a header regarding the received electronic mail;

accepting a setting of printing the header or a setting of not printing the header; and displaying a selection candidate for a sheet based on the accepted setting as a selection candidate for a sheet to be used for printing an image attached to the electronic mail, wherein the displaying comprises displaying the sheets of the plurality of sizes as selection candidates for the sheet in accordance with accepting the setting of not printing the header, displaying a sheet having a short side length equal to or larger than a predetermined length as a selection candidate for the sheet in accordance with accepting the setting of printing the header, and not displaying a sheet having a short side length smaller than the predetermined length as a selection candidate for the sheet in accordance with accepting the setting of printing the header.

11. A non-transitory computer-readable storage medium storing instructions that, when executed by a computer of an image forming apparatus capable of executing printing on a sheet included in sheets of a plurality of sizes, cause the computer to perform a method comprising:

receiving an electronic mail;

generating a header regarding the received electronic mail;

accepting a setting of printing the header or a setting of not printing the header; and displaying a selection candidate for a sheet based on the accepted setting as a selection candidate for a sheet to be used for printing an image attached to the electronic mail, wherein the displaying comprises displaying the sheets of the plurality of sizes as selection candidates for the sheet in accordance with accepting the setting of not printing the header, displaying a sheet having a short side length equal to or larger than a predetermined length as a selection candidate for the sheet in accordance with accepting the setting of printing the header, and not displaying a sheet having a short side length smaller than the predetermined length as a selection candidate for the sheet in accordance with accepting the setting of printing the header.

\* \* \* \* \*